(12) United States Patent  (10) Patent No.: US 7,773,644 B2
Oozeki (45) Date of Patent: Aug. 10, 2010

(54) FREQUENCY-STABILIZED LASER DEVICE, LASER FREQUENCY STABILIZING METHOD, AND LASER FREQUENCY STABILIZING PROGRAM

(75) Inventor: Hidekazu Oozeki, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 36 days.

(21) Appl. No.: 12/264,597

(22) Filed: Nov. 4, 2008

(65) Prior Publication Data

US 2009/0116520 A1     May 7, 2009

(30) Foreign Application Priority Data

Nov. 6, 2007    (JP) ............................. 2007-288052

(51) Int. Cl.
    *H01S 3/13*    (2006.01)
(52) U.S. Cl. ...................... 372/32; 372/29.015; 372/34; 372/36
(58) Field of Classification Search .................. 372/32, 372/34, 36
    See application file for complete search history.

(56) References Cited

U.S. PATENT DOCUMENTS

| | | | |
|---|---|---|---|
| 5,668,826 A | 9/1997 | Bezinge et al. | |
| 5,754,574 A | 5/1998 | Lofthouse-Zeis et al. | |
| 6,229,832 B1 | 5/2001 | Baba et al. | |
| 6,654,392 B1 | 11/2003 | Arbore et al. | |
| 6,940,881 B2 * | 9/2005 | Pontis et al. | ............. 372/29.02 |
| 2002/0009105 A1 | 1/2002 | Matsumoto | |
| 2006/0056470 A1 | 3/2006 | Liu et al. | |

FOREIGN PATENT DOCUMENTS

| | | | |
|---|---|---|---|
| EP | 0732781 A | | 9/1996 |
| EP | 0920095 A | | 6/1999 |
| JP | 57-124487 | * | 8/1982 |
| JP | 57-124487 | | 8/1982 |
| JP | 2000-261092 | | 9/2000 |
| JP | 2001-274495 | | 10/2001 |
| WO | 02/075873 A | | 9/2002 |
| WO | 2005/122348 A | | 12/2005 |
| WO | 2006/033909 A | | 3/2006 |

OTHER PUBLICATIONS

English language Abstract of JP 2001-274495, Oct. 5, 2001.
English language Abstract of JP 2000-261092, Sep. 22, 2000.
English language Abstract of JP 57-124487 A, Aug. 3, 1982.

* cited by examiner

*Primary Examiner*—Dung T Nguyen
(74) *Attorney, Agent, or Firm*—Greenblum & Bernstein, P.L.C.

(57) ABSTRACT

A frequency-stabilized laser device comprises an actuator arranged to vary the cavity length; an actuator driver arranged to apply a voltage to the actuator for changing displacement; a temperature detector arranged to detect the temperature on the cavity; a temperature adjuster arranged to heat or cool the cavity; a cavity temperature controller arranged to control the temperature adjuster based on a previously given instruction temperature and the temperature on the cavity detected at the temperature detector; and an instruction temperature corrector arranged to correct the instruction temperature given to the cavity temperature controller such that the voltage applied to the actuator remains almost constant.

20 Claims, 8 Drawing Sheets

FREQUENCY-STABILIZED LASER DEVICE, LASER FREQUENCY STABILIZING METHOD, AND LASER FREQUENCY STABILIZING PROGRAM

CROSS-REFERENCE TO RELATED APPLICATION

This application is based upon and claims the benefit of priority from prior Japanese Patent Application No. 2007-288052, filed on Nov. 6, 2007, the entire contents of which are incorporated herein by reference.

BACKGROUND OF THE INVENTION

1. Field of the Invention

The present invention relates to a frequency-stabilized laser device with improved stability over variations in ambient temperature and so forth, a laser frequency stabilizing method and a laser frequency stabilizing program.

2. Description of the Related Art

A continuous-wave oscillation, 532-nm range solid laser uses a Nd:YAG crystal or the like as a gain medium, which is pumped with a semiconductor laser. The wavelength of such the solid laser is utilized as the standard for lengths. An actual measurement using a wavelength of the laser requires the laser at a single frequency, that is, in a single longitudinal mode. Further, stabilization of the laser light frequency using an atomic or molecular absorption spectrometry requires the frequency arbitrarily selectable.

Methods of selecting among oscillation modes of the laser for simplification include one that uses etalons in a cavity and one that uses gratings in a cavity as well known. In selection of an arbitrary frequency, a frequency filter including an optical element such as the etalon is used to select the frequency of the laser passed therethrough, and the length of the cavity is controlled, thereby controlling the frequency of the laser light.

The use of the laser light wavelength for length measurement requires higher frequency stability of the laser light in order to reduce uncertainty of the length measurement. In an iodine-stabilized laser device using an iodine molecular absorption spectrometry, the frequency can be controlled at the center of a saturated absorption signal to produce a laser light with high frequency stability (see, for example, JP2001-274495A and JP 2000-261092A).

The frequency of the laser light can be controlled through control of the cavity length of the laser cavity. For example, the temperature on a cabinet of the laser cavity is controlled to suppress variations in size of the cabinet. In addition, the displacement of a mirror-attached actuator is controlled such that the frequency meets the center of the saturated absorption signal, thereby controlling the cavity length.

Though, variations in size of the cabinet due to fluctuations of the ambient air temperature and drifts of electric signals in an actuator driver circuit and an actuator controller may cause a variation in the voltage applied to the actuator. If this variation falls within a range of voltages applied to the actuator, the cavity length can be controlled. If the voltage applied to the actuator is saturated, however, the cavity length can not be controlled and the frequency can not be stabilized at the center of the saturated absorption signal.

On the other hand, a method may be considered for increasing the range of voltages applied to the actuator, thereby avoiding the saturation of the voltage applied to the actuator and increasing the maximum displacement of the actuator. In this method, however, the increase in the applied voltage range requires improvements in S/N ratios in the actuator driver circuit and the power source to make the noise component in the displacement equal to that before the control.

Another method may also be considered for using an actuator with a larger amount of displacement per applied voltage, thereby increasing the maximum displacement of the actuator. In this method, however, if the S/N ratio in the actuator driver circuit is equal to that before the control, the noise component in the displacement becomes relatively larger. Accordingly, the S/N ratio in the driver circuit should be improved to make the noise component in the displacement equal to that before the control. In addition, the drifts of electric signals should be reduced as well.

SUMMARY OF THE INVENTION

In an aspect the present invention provides a frequency-stabilized laser device generating a laser light in a cavity including a pair of mirrors located at the opposite positions, applying the laser light to an absorption cell to produce a light output signal, and varying the cavity length based on the light output signal to stabilize the frequency of the laser light, the laser device comprising: an actuator arranged to vary the cavity length; an actuator driver arranged to apply a voltage to the actuator for changing displacement; a temperature detector arranged to detect the temperature on the cavity; a temperature adjuster arranged to heat or cool the cavity; a cavity temperature controller arranged to control the temperature adjuster based on a previously given instruction temperature and the temperature on the cavity detected at the temperature detector; and an instruction temperature corrector arranged to correct the instruction temperature given to the cavity temperature controller such that the voltage applied to the actuator remains almost constant.

In another aspect the present invention provides a laser frequency stabilizing method generating a laser light in a cavity including a pair of mirrors located at the opposite positions, applying the laser light to an absorption cell to produce a light output signal, and controlling the voltage applied to an actuator that varies the cavity length, thereby stabilizing the laser frequency of the light output signal at the center of a specific saturated absorption line contained in the light output signal, the method comprising: monitoring the voltage applied to the actuator that brings the laser frequency at the center of the saturated absorption line; correcting the instruction temperature to the cavity based on the monitored voltage applied to the actuator such that the voltage applied to the actuator remains almost constant; and controlling the temperature on the cavity based on the corrected instruction temperature.

In another aspect the present invention provides a laser frequency stabilizing program generating a laser light in a cavity including a pair of mirrors located at the opposite positions, applying the laser light to an absorption cell to produce a light output signal, and controlling the voltage applied to an actuator that varies the cavity length, thereby stabilizing the laser frequency of the light output signal at the center of a specific saturated absorption line contained in the light output signal, the program comprising computer-executable steps of: monitoring the voltage applied to the actuator that brings the laser frequency at the center of the saturated absorption line; correcting the instruction temperature to the cavity based on the monitored voltage applied to the actuator such that the voltage applied to the actuator remains almost constant; and controlling the temperature on the cavity based on the corrected instruction temperature.

DETAILED DESCRIPTION OF THE EMBODIMENTS

The embodiments of the present invention will now be described in detail with reference to the drawings.

Figure 1:
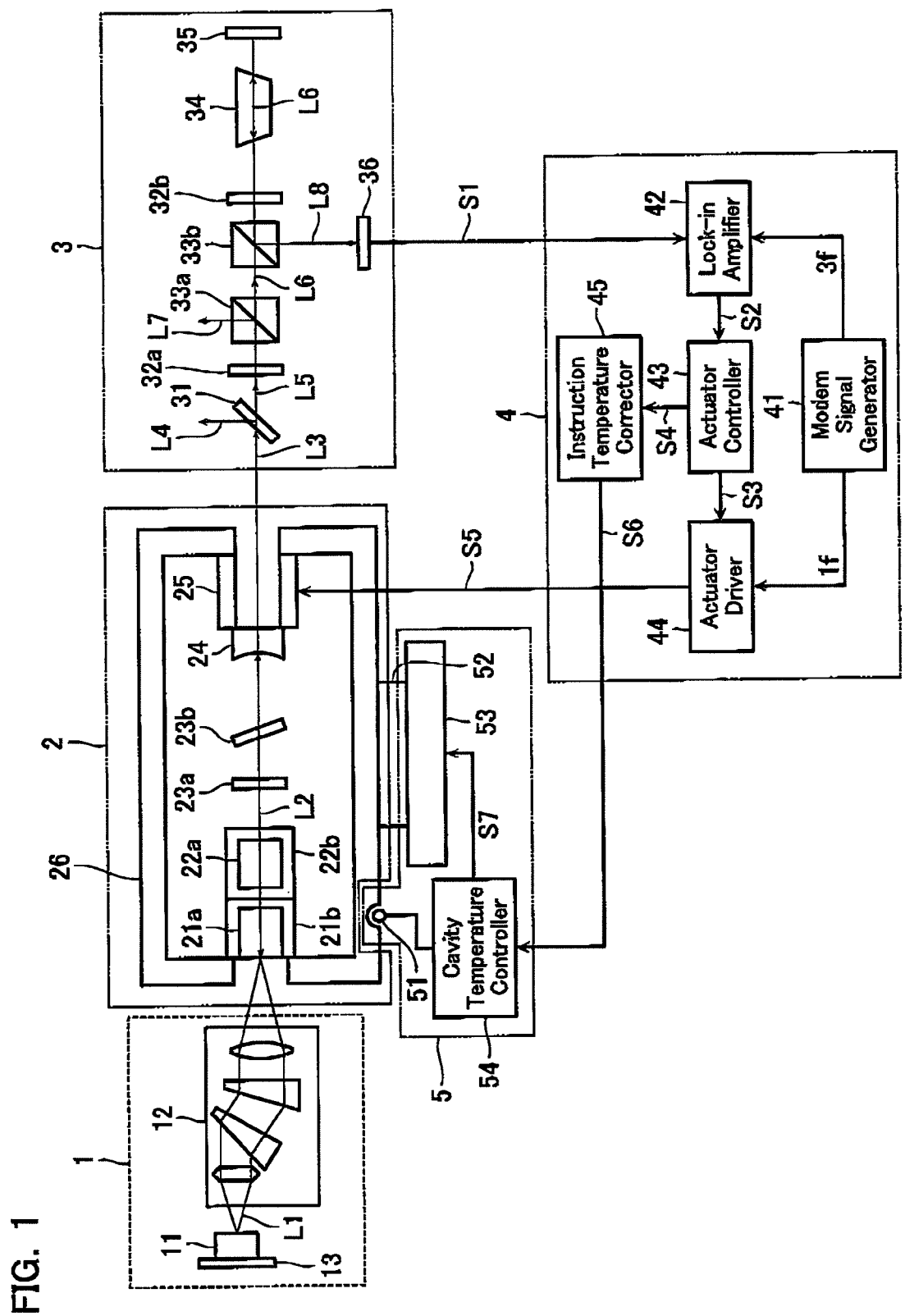
FIG. 1 is a block diagram of a frequency-stabilized laser device according to an embodiment of the present invention.

FIG. 1 is a block diagram of a frequency-stabilized laser device according to an embodiment of the present invention. The frequency-stabilized laser device comprises a pumping laser generator 1, a laser cavity 2, a laser detector 3, a drive controller 4, and a laser cavity temperature controller 5.

The pumping laser generator 1 includes a pumping semiconductor laser 11, a collector optics 12 composed of plural optical members, a pumping semiconductor laser heater/cooler 13 operative to heat or cool the pumping semiconductor laser 11. The pumping laser generator radiates a 808-nm wavelength laser light L1 while a drive current is supplied to the pumping semiconductor laser 11. The radiated laser light L1 is condensed through the collector optics 12 and guided into the laser cavity 2.

The laser cavity 2 has an entry side for the laser light L1 (the left side of the laser cavity 2 in FIG. 1), close to which a Nd:YVO4 crystal 21a and a KTP crystal 22a are located on the laser optical path in turn. The Nd:YVO4 crystal 21a is a diode-laser-pumped solid, which emits a 1064-nm wavelength light by stimulated radiation when the laser light L1 is applied to excite Nd atoms. At the entry side of the laser cavity 2 for the laser light L1, a coating is applied to the side to reflect the 1064-nm wavelength light. The KTP crystal 22a is a non-linear optical crystal, which converts part of the 1064-nm wavelength light by stimulated radiation into a secondary harmonic or a 532-nm wavelength light. If the 1064-nm wavelength light is in a single longitudinal mode, then the secondary harmonic 532-nm wavelength light is also in a single longitudinal mode. The Nd:YVO4 crystal 21a and the KTP crystal 22a are attached to a Nd:YVO4 crystal holder 21b and a KTP crystal holder 22b of brass having a relatively large linear expansion coefficient, respectively.

On the laser optical path in the laser cavity 2, a first etalon 23a and a second etalon 23b are arranged. The first etalon 23a and the second etalon 23b are arranged at a certain angle to the optical path. These etalons 23a, 23b are characterized to allow a specific frequency of the laser light to transmit therethrough.

The laser cavity 2 has a laser light exit side, close to which a reflecting mirror 24 and an actuator 25 are located on the laser optical path in turn. These members contained in the laser cavity 2 are housed in a cabinet 26. The reflecting mirror 24 is coated to reflect the 1064-nm wavelength light therefrom and transmit the 532-nm wavelength light therethrough. Therefore, the Nd:YVO4 crystal 21a and the reflecting mirror 24 configure a cavity only for the 1064-nm wavelength light. The actuator 25 comprises a piezoelectric element, which deforms on voltage application and shifts the position of the reflecting mirror 24 along the optical path. As described below in detail, the temperature on the laser cavity 2 can be controlled to keep the voltage applied to the actuator 25 constant, thereby stabilizing the frequency of the laser device without saturating the voltage applied to the actuator 25.

The light, which enters the end surface of the laser cavity 2 facing the pumping laser generator 1 and then passes through the Nd:YVO4 crystal 21a and the KTP crystal 22a, turns in a light L2 having wavelengths of 532 nm, 808 nm and 1064 nm. The light L2 is amplified and wavelength-selected in the laser cavity 2 to produce a laser light L3 having wavelengths of 1064 nm and 532 nm in a single longitudinal mode.

The following detailed description is given to the laser detector 3.

The laser detector 3 includes a harmonic separator 31, a polarizing plate 32a, two polarizing beam splitters 33a, 33b, a λ/4 plate 32b, an iodine cell 34, a reflecting plate 35 and a light detector 36.

The harmonic separator 31 splits the laser light L3 having wavelengths of 1064 nm and 532 nm into a 1064-nm wavelength laser light L4 and a 532-nm wavelength laser light L5.

The 532-nm wavelength laser light L5 is polarized through the polarizing plate 32a. In this case, the p-polarized light thereof transmits through the polarizing beam splitter 33a and becomes a laser light L6 while the s-polarized light thereof is reflected from the polarizing beam splitter 33a and becomes a laser light L7. The laser light L7 is the output light from the present frequency-stabilizing device and may be used in measurement of lengths. The laser light L6 then passes through the polarizing beam splitter 33b, the λ/4 plate 32b and the iodine cell 34 and reaches the reflecting plate 35. The light reflected therefrom passes through the iodine cell 34 and the λ/4 plate 32b again and reaches the polarizing beam splitter 33b. The light reflected therefrom becomes a laser light L8.

The p-polarized laser light L6 passes through the iodine cell 34, at which a specific wavelength is absorbed, and through the λ/4 plate 32b twice, at which the p-polarized state is polarized to the s-polarized state, and becomes the laser light L8. The s-polarized laser light L8 is reflected from the polarizing beam splitter 33b to the light detector 36. The light detector 36 comprises a photoelectric transducer such as a photodetector, which photoelectrically transduces the laser light L8 to a signal S1. As described below in detail, the signal S1 is used as the reference for frequency stabilizing control of the laser light.

The following detailed description is given to the drive controller 4.

The drive controller 4 includes a modem signal generator 41, a third order differential lock-in amplifier 42, an actuator controller 43, an actuator driver 44, and an instruction temperature corrector 45.

The modem signal generator 41 is connected to the third order differential lock-in amplifier 42 and the actuator driver 44. The third order differential lock-in amplifier 42 is connected to the actuator controller 43. The actuator controller 43 is connected to the actuator driver 44. The instruction temperature corrector 45 is connected to a cavity temperature controller 54 as described later.

The modem signal generator 41 provides a 1 f-Hz frequency signal to the actuator driver 44 and provides a 3 f-Hz frequency signal to the third order differential lock-in amplifier 42. The third order differential lock-in amplifier 42 receives the laser light output signal S1 photoelectrically transduced from the laser light L8. The lock-in amplifier uses the 3 f-Hz frequency signal from the modem signal generator 41 in demodulation to produce a third order differential signal S2, which is provided to the actuator controller 43.

The actuator controller 43 provides a control signal S3 based on the third order differential signal S2 to the actuator driver 44, which correspondingly produces a voltage applied to the actuator 25. The actuator controller 43 sends a temperature prediction signal S4 to the instruction temperature corrector 45 as described below in detail.

The actuator driver 44 adds the control signal S3 received from the actuator controller 43 to the 1 f-Hz frequency signal received from the modem signal generator 41 to produce an actuator drive signal S5, which is provided to drive the actuator 25. Thus, the actuator varies the cavity length to control the frequency of the laser light L8.

The instruction temperature corrector 45 is connected to a cavity temperature controller 54 and provides a correction signal S6 for use in correcting the instruction signal for temperature control of the laser cavity 2 as described below in detail.

For example, the actuator controller 43 and the instruction temperature corrector 45 can be partly or entirely realized with a computer (not shown), which comprises a memory for storing programs and a CPU for executing the programs.

The following detailed description is given to the laser cavity temperature controller 5. The laser cavity temperature controller 5 includes a temperature detector 51, a Peltier element 52, a radiator 53 and a cavity temperature controller 54.

The temperature detector 51 measures the temperature on the laser cavity 2. The cavity temperature controller 54 provides a control signal S7 corresponding to the voltage applied to the Peltier element 52 based on the temperature on the laser cavity 2 measured at the temperature detector 51. The Peltier element 52 heats or cools the cabinet 26 of the laser cavity 2 in accordance with the applied voltage and polarity corresponding to the control signal S7. The radiator 53 is deposited outside the Peltier element 52.

The principle of stabilizing the frequency in the frequency-stabilized laser device according to the present embodiment is described next in detail with reference to the drawings.

Figure 2:
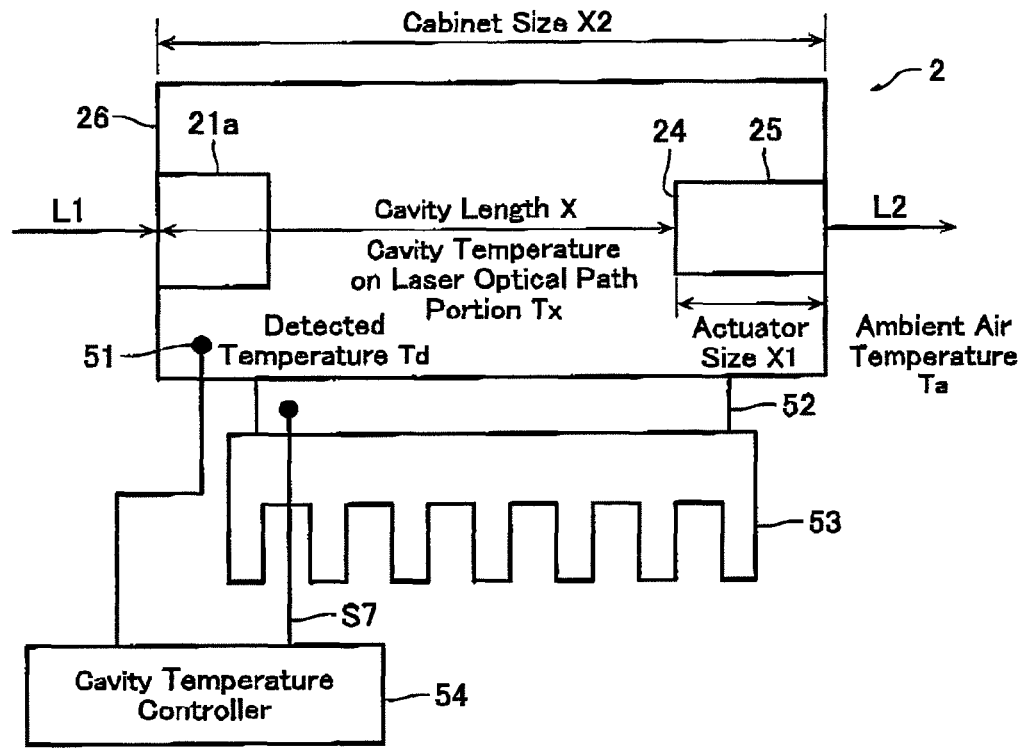
FIG. 2 is a brief enlarged diagram of a cavity portion in the frequency-stabilized laser device according to the embodiment of the present invention.

FIG. 2 is an enlarged diagram showing the laser cavity 2 and the laser cavity temperature controller 5, from which several elements are omitted for convenience of description.

The distance along the optical path between the entry surface of the Nd:YVO4 crystal 21a for the semiconductor laser light L1 and the reflecting surface of the reflecting mirror 24 is defined as the cavity length X. The size of the actuator 25 along the optical path is indicated with X1 and the size of the cabinet 26 along the optical path is indicated with X2. The cavity temperature in the vicinity of the optical path of the laser light is indicated with Tx, the temperature detected at the temperature detector 51 is indicated with Td, and the ambient temperature (atmospheric temperature) around the cabinet 26 of the laser cavity 2 is indicated with Ta. The cavity length X can be defined by the following expression.

$$X = X2 - X1 \quad (1)$$

The actuator drive signal S5, resulted from addition of the actuator control signal S3 to the 1 f-Hz frequency signal from the modem signal generator 41, deforms the actuator 25 and thus varies the actuator size X1. As a result, the cavity length X is varied to modulate the frequency of the laser light L3. Therefore, the laser lights L3-8 in the laser detector 3 become modulated lights, and thus the light output signal S1 photoelectrically transduced from the laser light LB also becomes a modulated signal. The light output signal S1 is demodulated in the lock-in amplifier 42 to produce a third order differential signal. The third order differential signal includes peaks and valleys of saturated absorption signals due to resonance absorption by iodine molecules, which are detectable at plural locations within a frequency band of 1.5 GHz. An arbitrary saturated absorption line is selected from the saturated absorption lines and the cavity length X is controlled such that the frequency is always kept at the selected saturated absorption line. Thus, the resonance frequency of the laser light can be stabilized. This point is described in detail using the drawings.

Figure 3:
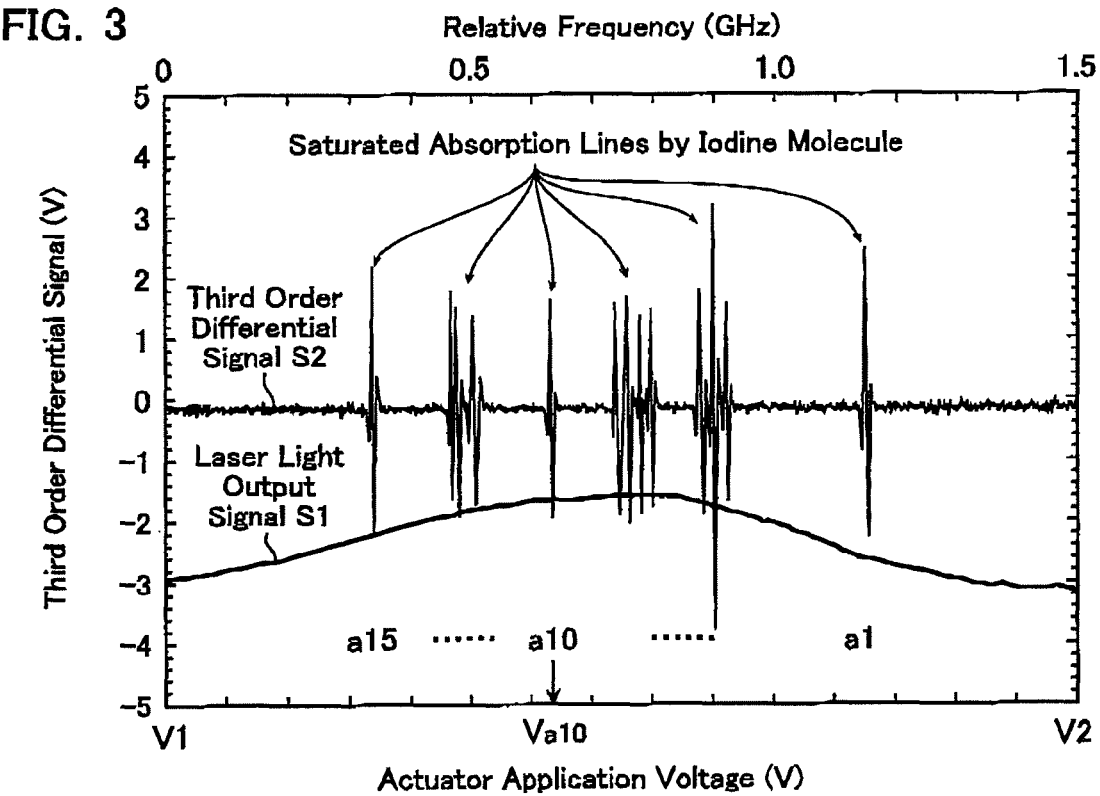
FIG. 3 provides graphs representing a relation between a third order differential signal exhibiting iodine molecular absorption lines and an optical intensity signal in the frequency-stabilized laser device according to the embodiment of the present invention.
Figure 4:
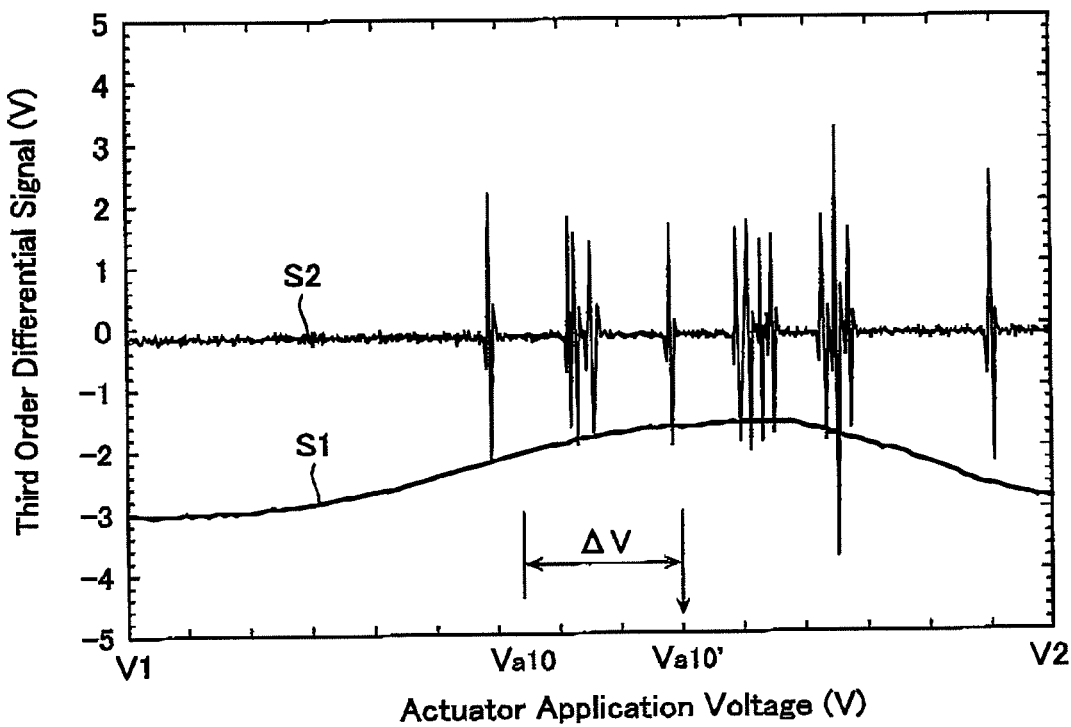
FIG. 4 provides graphs representing a relation between a third order differential signal exhibiting iodine molecular absorption lines and an optical intensity signal in the frequency-stabilized laser device according to the embodiment of the present invention.
Figure 5:
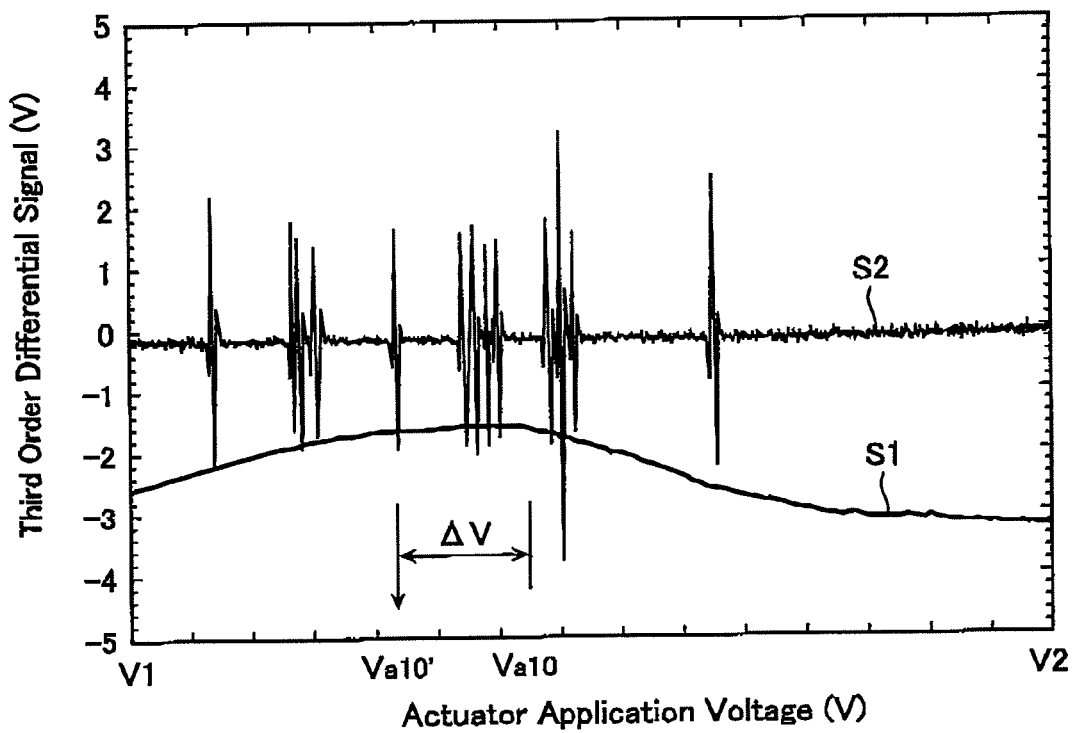
FIG. 5 provides graphs representing a relation between a third order differential signal exhibiting iodine molecular absorption lines and an optical intensity signal in the frequency-stabilized laser device according to the embodiment of the present invention.

FIGS. 3-5 provide graphs representing relations between the laser light output signal S1 and the third order differential signal S2 over the voltage applied to the actuator for description of the principle of frequency stabilizing. FIG. 3 shows an example of the result from observation of the laser light output signal S1 and the third order differential signal S2 when the instruction temperature Tdc to the cavity temperature controller 54 is Tdc=T. In this case, after the temperature on the laser cavity 2 is stabilized, the voltage applied to the actuator 25 is swept from V1 to V2. Within a frequency band of around 1 GHz, saturated absorption lines by iodine molecules are detected on 15 lines (a1-a15). A saturated absorption line a10 is selected from the 15 saturated absorption lines. In this case, the voltage applied to the actuator 25 to bring the laser frequency at the center of the saturated absorption line a10 is defined as Va10.

FIG. 4 shows an example of the result from observation of the laser light output signal S1 and the third order differential signal S2 when the instruction temperature Tdc to the cavity temperature controller 54 is Tdc=T+ΔT. A rise ΔT of the temperature on the laser cavity 2 increases the cabinet size X2 due to thermal expansion of the cabinet 26. If the actuator drive voltage is unchanged, the increase in the cabinet size X2 lengthens the cavity length X and accordingly lowers the laser frequency. Therefore, when the voltage applied to the actuator 25 is swept from V1 to V2 like in FIG. 3, the voltage Va10 applied to the actuator 25, corresponding to the center of the saturated absorption line a10, is shifted to the right by ΔV.

FIG. 5 shows an example of the result from observation of the laser light output signal S1 and the third order differential signal S2 when the instruction temperature Tdc to the cavity temperature controller 54 is Tdc=T−ΔT. A fall ΔT of the temperature on the laser cavity 2 decreases the cabinet size X2 due to contraction of the cabinet 26. If the actuator drive voltage is unchanged, the decrease in the cabinet size X2 shortens the cavity length X and accordingly elevates the laser frequency. Therefore, when the voltage applied to the actuator 25 is swept from V1 to V2 like in FIG. 3, the voltage Va10 applied to the actuator 25, corresponding to the center of the saturated absorption line a10, is shifted to the left by ΔV.

A variation ΔT caused in the temperature on the laser cavity 2 changes the cavity length X. In this case, if the laser frequency is subjected to stabilizing control, the voltage applied to the actuator varies by ΔV, which changes the size X1 of the actuator 25 as well. As a result, the cavity length X remains unchanged, keeping the stability of the resonance frequency of the laser light.

A ratio of the variation ΔV in the voltage Va applied to the actuator to the cavity temperature variation ΔT is defined below as a variation rate K.

$$k = \Delta V / \Delta T \tag{2}$$

The variation rate K may be sought previously to predict the cavity temperature variation ΔT from the applied voltage variation ΔV.

Figure 6:
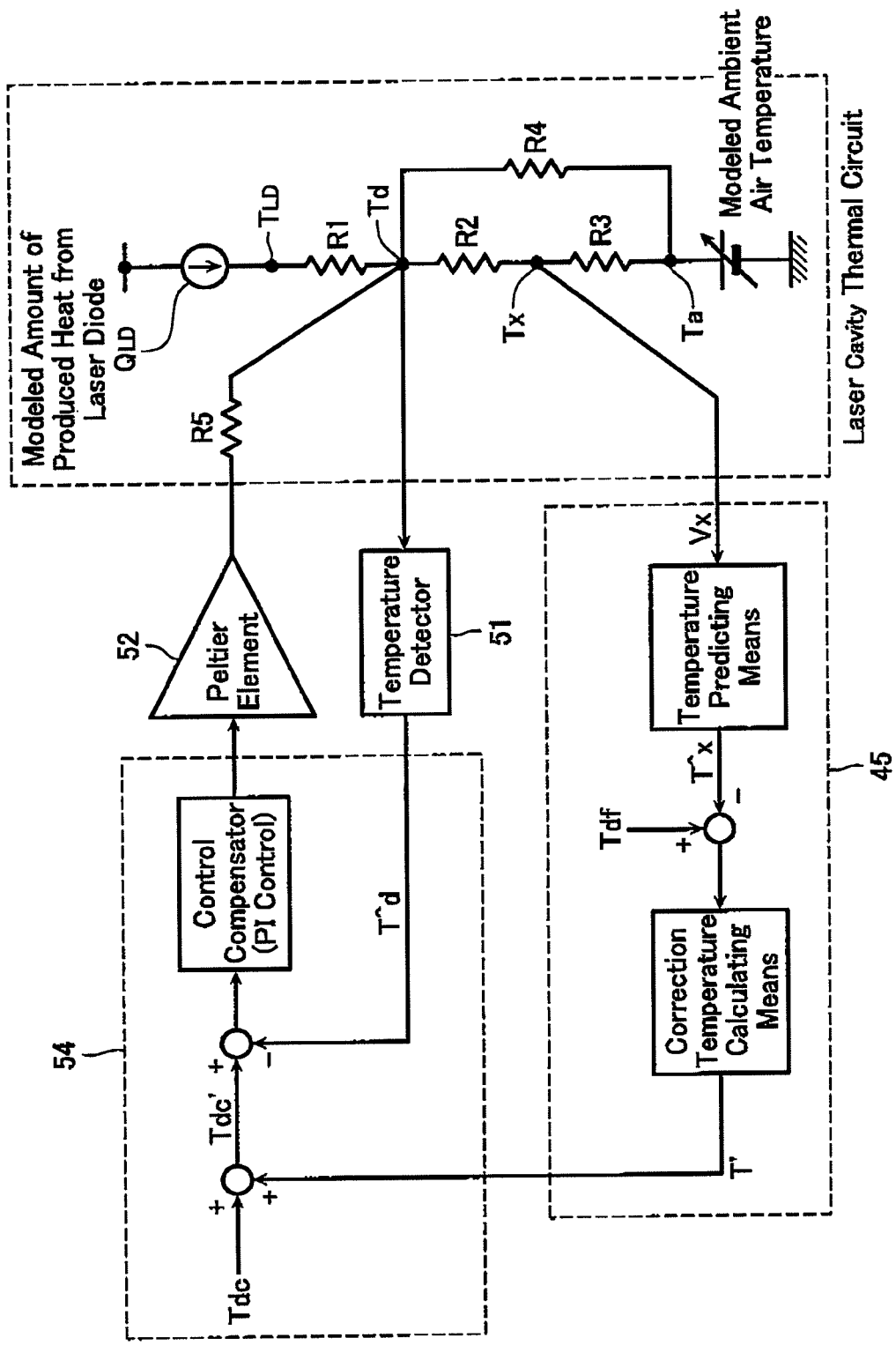
FIG. 6 shows a thermal circuit in the frequency-stabilized laser device according to the embodiment of the present invention.

The laser cavity 2 is described next in more detail using a thermal circuit model. FIG. 6 briefly shows a thermal circuit model of the laser cavity 2 and a block diagram of the cavity temperature controller 5 and the instruction temperature corrector 45. The instruction temperature to the cavity temperature controller 54 is indicated with Tdc. The temperature detected at the temperature detector 51 is indicated with Td. The ambient temperature (atmospheric temperature) is indicated with Ta. The temperature on the optical path portion inside the laser cavity 2 is indicated with Tx. The amount of heat produced from the laser diode 11 (the pumping semiconductor laser 11) is indicated with QLD. The thermal resistance from the laser diode 11 to the laser cavity 2 is indicated with R1. The thermal resistance from the temperature detector 51 to the optical path portion is indicated with R2. The thermal resistance from the optical path portion to the ambient (atmosphere) is indicated with R3. The thermal resistance from the Peltier element 52 to the ambient (atmosphere) is indicated with R4. The thermal resistance from the Peltier element 52 to the laser cavity 2 is indicated with R5. A thermal equation regarding the temperature Td detected at the temperature detector 51 and the ambient temperature Ta is represented as follows.

$$Td - Ta = QLD \times \{R4 \times (R2 + R3)/(R2 + R3 + R4)\} \tag{3}$$

The cavity temperature controller 54 uses the temperature Td in feedback control, which is detected at the temperature detector 51 composed of, for example, a thermocouple. Accordingly, the temperature detected at the temperature detector 51 meets the instruction temperature Tdc (that is, Td=Tdc). If the temperature detector 51 is spaced from the Peltier element 52, the temperature control may not be stabilized possibly. Therefore, in many cases, the temperature detector 51 is located near the Peltier element 52. The temperature Tx on the optical path portion is represented with the thermal circuit model of FIG. 6 as follows.

$$Tx = Td - \{R2/(R2+R3)\} \times (Td - Ta) \tag{4}$$

The temperature on the laser cavity 2 is controlled by the cavity temperature controller 54. An actual position of the temperature detector 51 is, however, not coincident with the position of the laser optical path portion. Therefore, Td can not meet Tx due to the thermal resistance R2 (that is, Td ≠ Tx).

Even in the case of Td=Tdc under control, a variation in Ta causes a fluctuation of Tx as show in the above equation (4). Namely, a fluctuation ΔTx of Tx changes the cabinet size X2 and causes a variation ΔV in the voltage Va applied to the actuator 25 (the voltage applied to the actuator that brings the laser frequency at the center of specific saturated absorption line).

It can be found from the above consideration that the variation in the ambient temperature Ta changes Va. Conversely, if the instruction temperature Tdc can be corrected so as to compensate for the fluctuation of the temperature Tx on the optical path portion due to the variation in the ambient temperature Ta, then Va can be fixed within a range of voltages applied to the actuator. In such the case, it is not required to monitor the variation in temperature on the laser cavity 2 to change the voltage Va applied to the actuator 25 sequentially, and thus a robust frequency-stabilized laser can be produced.

Therefore, the variation rate k derived from the above equation (2) is used to correct Tdc. Specifically, the following equations (5) and (6) are used to calculate the corrected instruction temperature Tdc'.

$$T' = TdF - \Delta V / k \tag{5}$$

$$Tdc' = Tdc + T' \tag{6}$$

In the above equation, TdF indicates such an instruction temperature Tdc that brings the voltage Va applied to the actuator at Va=Vc when the ambient (atmospheric) temperature is Ta=20° C. (Vc indicates the central value in the range of applied voltages (=Vmin+(Vmax−Vmin)/2)).

Correction of Tdc can be executed as follows. First, when the fluctuation of the ambient temperature Ta changes the voltage Va applied to the actuator by ΔV, the equation (5) is used to calculate T'. Next, the equation (6) is used to correct Tdc and the corrected instruction temperature Tdc' is used at the cavity temperature controller 54 to control the temperature on the cavity 2.

Thus, even if the fluctuation of the ambient air temperature Ta changes the cabinet size X2 of the cavity, the instruction temperature Tdc to the cavity temperature controller 54 can be corrected to keep the voltage Va applied to the actuator 25 constant. Therefore, the laser frequency can be stabilized without saturating the voltage applied to the actuator.

A method of controlling the temperature on the frequency-stabilized laser according to the present embodiment is described next with reference to the drawings.

Figure 7:
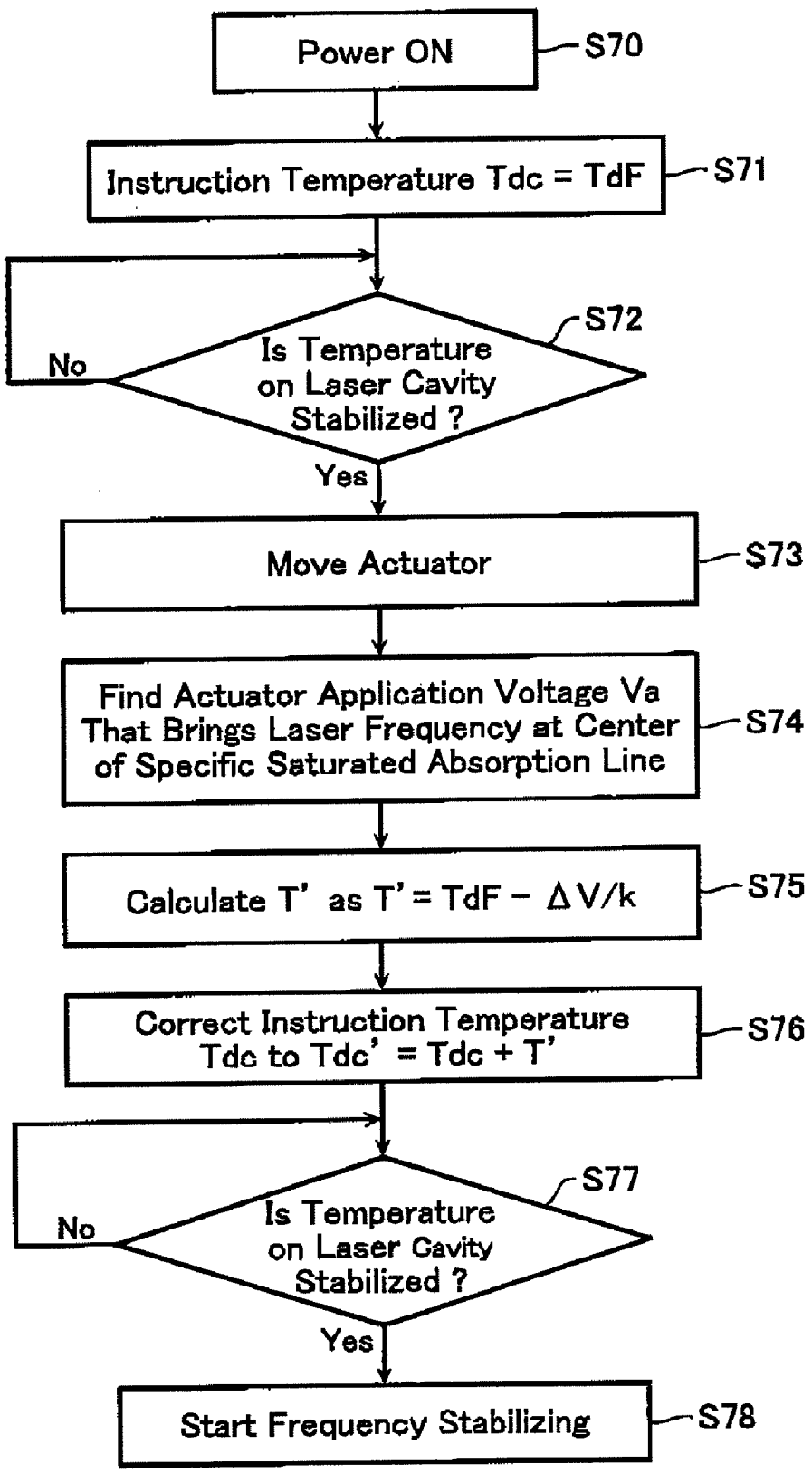
FIG. 7 is a flowchart showing a method of controlling the temperature in the frequency-stabilized laser device according to the embodiment of the present invention.

FIG. 7 is a flowchart illustrative of temperature control steps before stabilizing the frequency in the laser cavity 2. The steps shown in FIG. 7 can be realized by the actuator controller 43 that executes the program read out of a storage unit (not shown).

First, at step S70, the power of the laser cavity 2 is turned on to start operation. At step S71, the cavity temperature controller 54 sets the instruction temperature at Tdc=TdF as an initial condition.

Next, at step S72, it is decided whether the temperature on the laser cavity 2 is stabilized or not. This deciding method is described later. If it is decided that the temperature on the laser cavity 2 is stabilized, then the flow goes to step 73, that is, the step of moving the actuator 25. If it is decided that the temperature on the laser cavity 2 is not yet stabilized, then the flow does not go to the next step 73 until the temperature is stabilized.

At step 73, the modem signal generator 41 continuously sweeps the voltage applied to the actuator 25 from the minimum value to the maximum value within the range of applied voltages.

Subsequently, at step 74, the third order differential signal is monitored to find the voltage Va (see FIG. 3) applied to the actuator 25 that brings the laser frequency at the center of a specific saturated absorption line by the iodine cell 34.

Next, at step 75, the correction temperature controller 45 uses the equation (5) to calculate the correction temperature T' in accordance with $\Delta V = Va - Vc$ where Vc indicates the central value in the range of applied voltages.

Then, at step 76, the correction temperature controller 45 uses the equation (6) to calculate the corrected instruction temperature Tdc' in accordance with the correction temperature T', and the cavity temperature controller 54 provides the corrected instruction temperature Tdc' signal to the Peltier element 52.

Next, at step 77, once again, it is decided whether the temperature on the laser cavity 2 is stabilized or not. If it is decided that the temperature on the laser cavity 2 is stabilized, then the flow goes to step 78 to start frequency stabilizing, and the actuator controller 43 controls the cavity length X such that Va meets the center of a specific saturated absorption line.

Through such the correction of the instruction temperature Tdc, the fluctuation of the temperature on the laser optical path portion can be compensated for such that the voltage Va applied to the actuator 25 is controlled to meet the central value Vc in the range of applied voltages.

Figure 8:
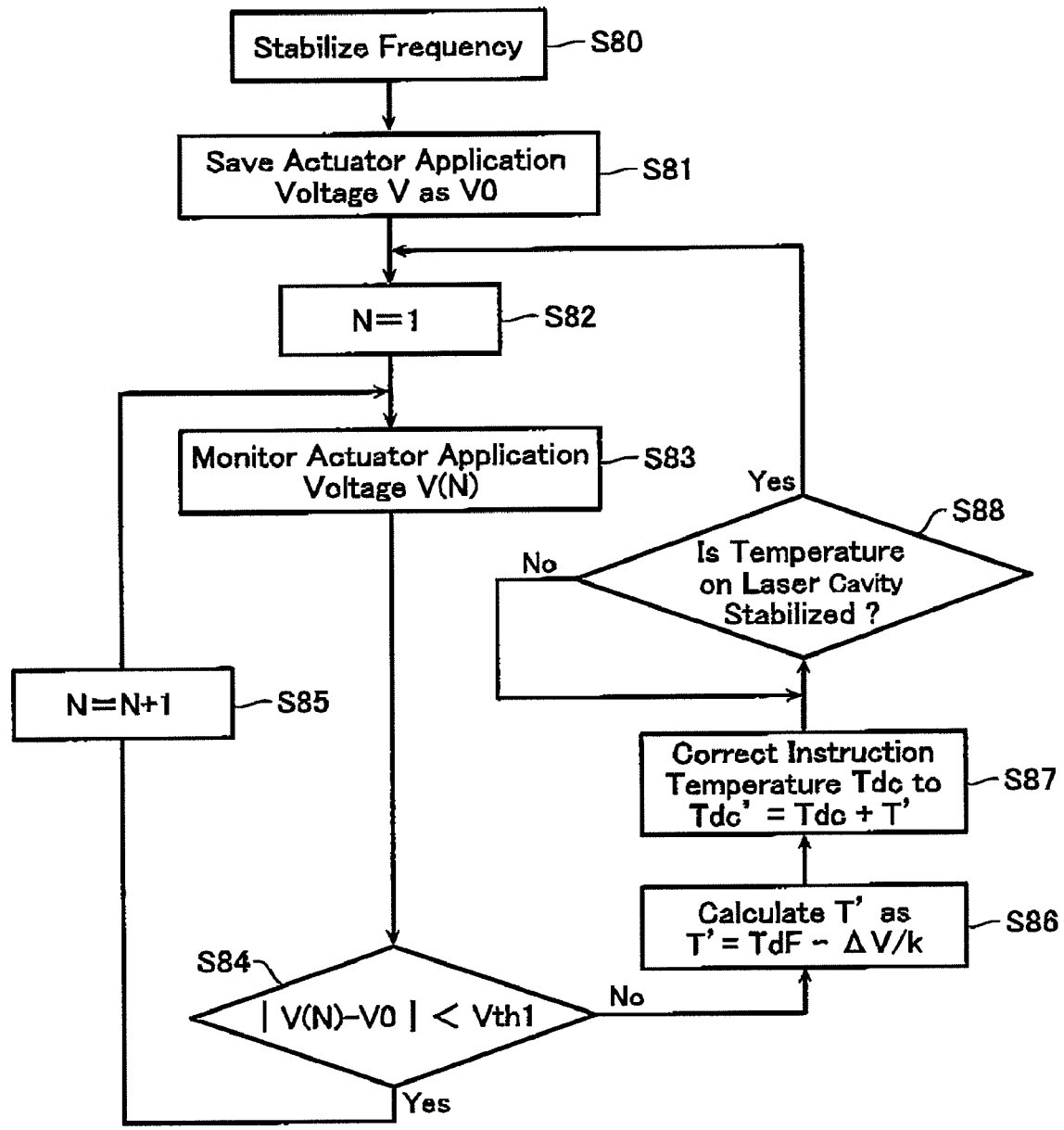
FIG. 8 is a flowchart showing a method of controlling the temperature in the frequency-stabilized laser device according to the embodiment of the present invention.

FIG. 8 is a flowchart illustrative of temperature control steps after stabilizing the frequency in the laser cavity 2. The steps shown in FIG. 8 can be realized by the actuator controller 43 that executes the program read out of a storage unit (not shown).

First, at step S80, it is confirmed that the cavity length X of the laser cavity 2 is controlled. Thereafter, at step S81, the initial voltage V(0) applied to the actuator 25 is stored in a memory.

Next, at step S82, the actuator controller 43 determines a sampling interval st1 associated with the voltage applied to the actuator 25 and sets the order N at 1 where N is a natural number.

Then, at step S83, the actuator controller 43 monitors the N-th voltage V(N) applied to the actuator 25.

Next, at step S84, an absolute value $|V(N)-V(0)|$ of the difference between the N-th voltage V(N) applied to the actuator 25 monitored at the actuator controller 43 and the initial voltage V(0) applied to the actuator 25 is calculated and compared with a certain threshold voltage Vth1. If the comparison results shows $|V(N)-V(0)| < vth1$, then the influence of the fluctuation of the ambient temperature Ta is decided negligible. In this case, Tdc is not corrected, and the order N is advanced by 1 at step S85. If the comparison results shows $|V(N)-V(0)| \geq Vth1$, then it is decided that the cabinet size X2 varies because the fluctuation of the ambient temperature Ta causes a significant fluctuation of the temperature Tx on the laser optical path portion. In this case, the instruction temperature Tdc is corrected.

First, at step S86, the correction temperature controller 45 uses the equation (5) to calculate the correction temperature T' in accordance with $\Delta V = V(N) - V(0)$.

Then, at step 87, the correction temperature controller 45 uses the equation (6) to calculate the corrected instruction temperature Tdc' in accordance with the correction temperature T', and the cavity temperature controller 54 provides the corrected instruction temperature Tdc' signal to the Peltier element 52.

Next, at step 88, it is decided whether the temperature on the laser cavity 2 is stabilized or not. If it is decided that the temperature on the laser cavity 2 is stabilized, then the flow returns to step 82.

Through such the correction of the instruction temperature Tdc, the fluctuation of the temperature Tx on the laser optical path portion can be compensated for such that the voltage V(N) applied to the actuator 25 is controlled at V(0). As $V(0) \approx Vc$ immediately after the beginning of frequency stabilizing, the voltage V(N) applied to the actuator 25 is consequently almost equal to Vc.

The threshold voltage level Vth1 is described. The correction of the instruction temperature Tdc to the cavity temperature controller 54 should be executed before the voltage V(N) applied to the actuator 25 exceeds the range of applied voltages. In consideration of $V(0) \approx Vc$, the threshold voltage level Vth1 is set to satisfy the following equation (7).

$$Vth1 < (Vmax - Vc) = (Vmax - Vmin)/2 \qquad (7)$$

In practice, in the transition state until the temperature on the cavity is stabilized after Tdc is corrected, Vth1 is set to the extent that can not saturate the voltage V(N) applied to the actuator 25 within the range of the above equation (7).

The variation in the voltage V(N) applied to the actuator 25 may depend not on the variation in the ambient (atmospheric) temperature Ta but on the drift of the electric signal. Even in such the case, the instruction temperature Tdc to the cavity temperature controller 54 can be corrected as above such that the fluctuation of the temperature Tx on the laser optical path portion can be compensated for and the voltage applied to the actuator 25 can be controlled at V(0). Accordingly, it is possible to prevent saturation of the voltage V(N) applied to the actuator 25 and keep the frequency-stabilized state.

The following description is given to a method of deciding the stabilization of the temperature on the cavity 2 for use in the above steps S72, S77, S88.

Figure 9:
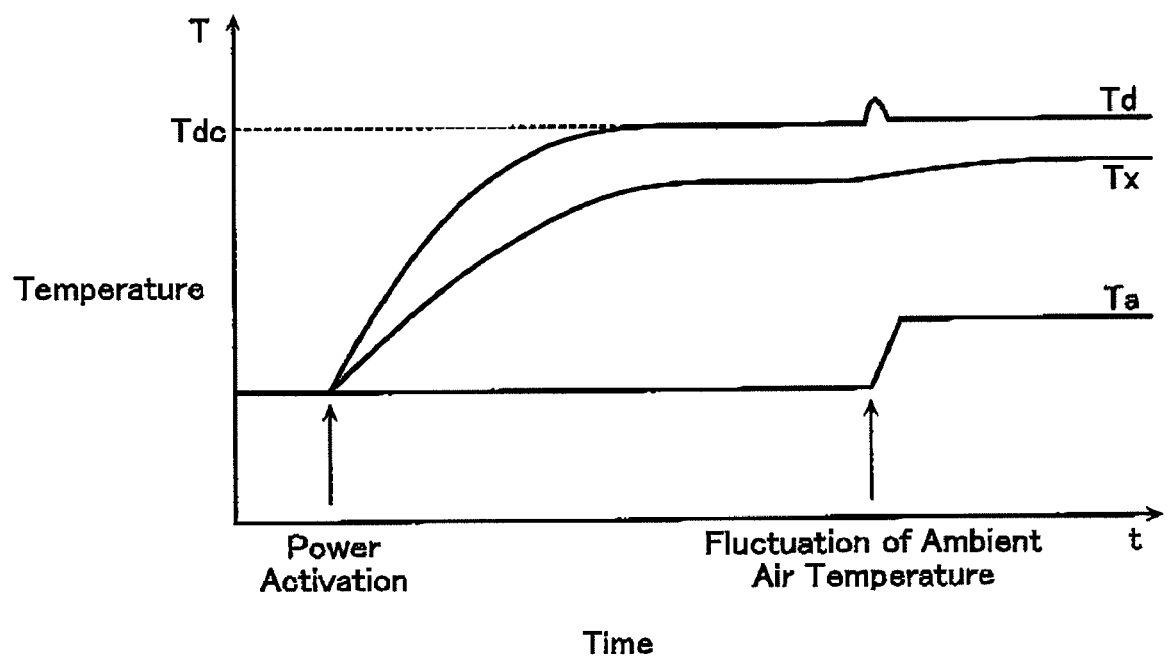
FIG. 9 provides graphs showing temporal variations in a temperature Td inside the cavity and a temperature Tx on the laser optical path in the frequency-stabilized laser device according to the embodiment of the present invention.

As shown in the above equation (4), if the ambient (atmospheric) temperature Ta differs from the instruction temperature Tdc, the temperature Td detected at the temperature detector 51 also differs from the temperature Tx on the laser optical path portion as the temperature detector 51 is located near the Peltier element 52. FIG. 9 shows temporal variations in the ambient air temperature Ta, the temperature Td detected at the temperature detector 51 and the temperature Tx on the laser optical path portion.

As shown in FIG. 9, after power activation and in the case 80 of a fluctuation caused in the ambient air temperature Ta, the temperature Td detected at the temperature detector 51 and the temperature Tx on the laser optical path portion differ in time required for convergence of temperature. Namely, Td can converge faster than Tx in the transition state due to the influence of the thermal capacity of the laser cavity 2. Therefore, even if the temperature Td detected at the temperature detector 51 converges, the temperature Tx on the laser optical path portion may not converge possibly. Accordingly, the temperature stabilization can not be decided only with the value of Td. If the instruction temperature Tdc is corrected using the actuator application voltage Va before the temperature Tx on the laser optical path portion converges, Tx can not be stabilized and may be oscillating possibly.

Figure 10:
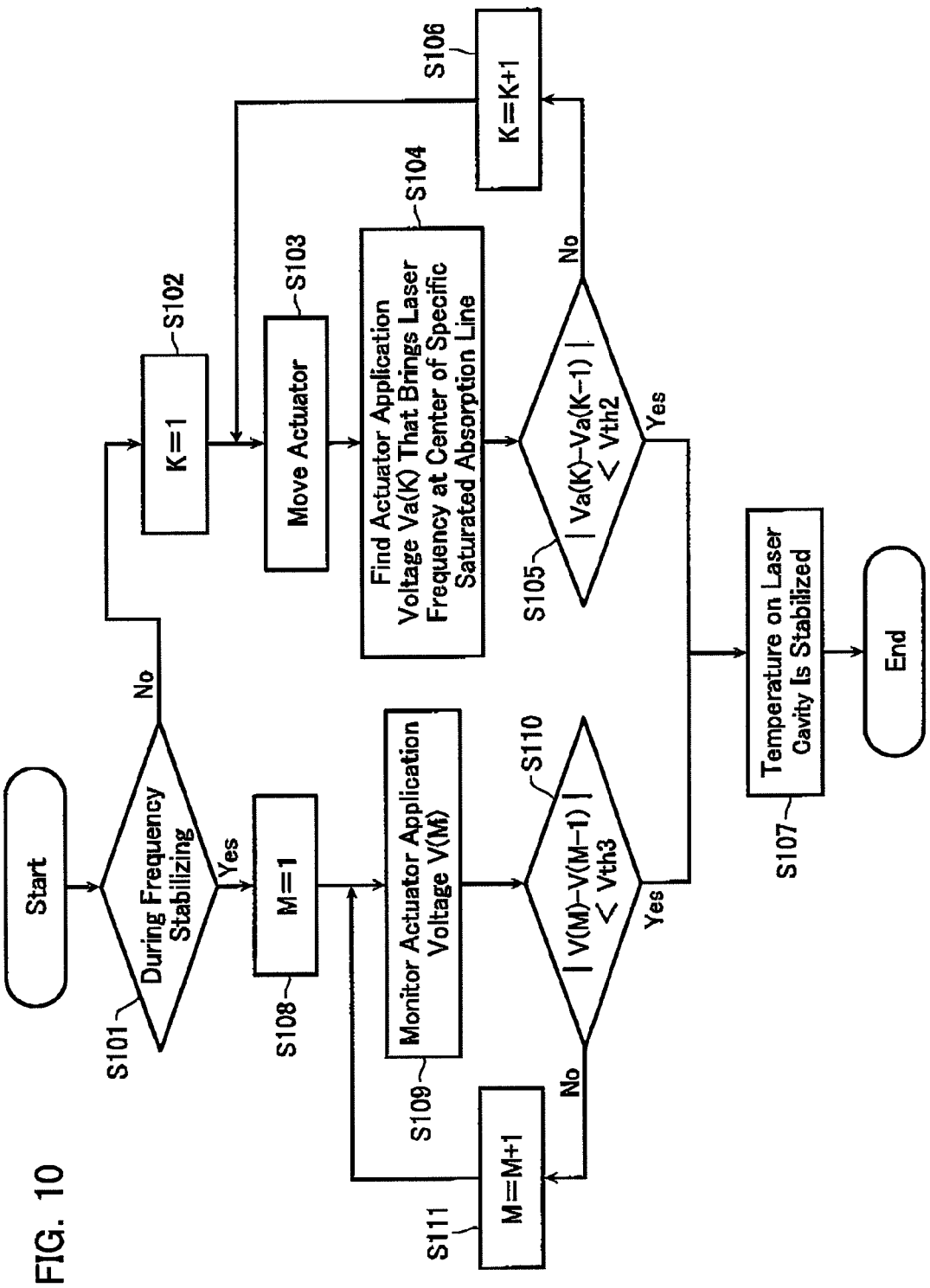
FIG. 10 is a flowchart showing a method of deciding the temperature stabilized in the frequency-stabilized laser device according to the embodiment of the present invention.

Therefore, the voltage Va applied to the actuator 25, corresponding to the center of a specific saturated absorption line, is monitored to decide the stabilization of the temperature Tx on the laser optical path portion. A method of deciding the temperature stabilization is described below with reference to the drawings. FIG. 10 is a flowchart illustrative of the method of deciding the temperature stabilization. The steps shown in FIG. 10 can be realized by the actuator controller 43 that executes the program read out of a storage unit (not shown).

First, as step S101, the state of operation of the laser cavity 2 is determined. If it is determined as the state during frequency stabilizing, then the flow goes to step S108. If it is determined as the state before frequency stabilizing, then the flow goes to step S102.

If it is the state before frequency stabilizing, then the actuator controller 43 determines at step S102 a sampling interval st2 and sets K=1 where K is a natural number.

Next, as step S103, the voltage applied to the actuator 25 is swept.

As step S104, the third order differential signal S2 is monitored during the process of sweeping to find the voltage Va(K) applied to the actuator 25 that brings the laser frequency at the center of a specific saturated absorption line by the iodine cell 34.

Next, as step S105, the difference |Va(K)−Va(K−1)| between the value monitored at the previous sampling and the value monitored at the current sampling is calculated and compared with a certain threshold voltage Vth2. If |Va(K)−Va(K−1)|<Vth2, then it is determined that the temperature Tx on the laser optical path portion converges and it is decided at step S107 that the temperature on the laser cavity 2 is stabilized. If |Va(K)−Va(K−1)|≧Vth2, then it means that the temperature Tx on the laser optical path portion does not converge but varies. Accordingly, the flow goes to step S106 to advance K by 1 and then returns to step S103 again.

The threshold voltage level Vth2 is described. For example, it the temperature rise increases the cabinet size X2, the rate of the variation in the cabinet size X2 may become faster than the velocity v [V/m] of moving the actuator 25. In such the case, even if the actuator 25 is moved positively to increase the size X1 of the actuator 25, the cavity length X can only cause increases in accordance with the above equation (1). The velocity of moving the actuator 25 can be represented by {Va(K) −Va(K−1)}/st2. Therefore, if {Va(K)−Va(K−1)}/st2<V, then the cavity length X can be increased or decreased. Accordingly, the voltage level Vth2 for deciding the convergence of Tx is set to satisfy the following relation.

$$Vth2/st2 < V \tag{8}$$

On the other hand, if it is the state during frequency stabilizing, then the actuator controller 43 determines at step S108 a sampling interval st3 and sets M=1 where M is a natural number.

Next, at step S109, the actuator controller 43 monitors the voltage V(M) applied to the actuator. During frequency stabilizing, when the instruction temperature Tdc is corrected, the temperature Tx on the laser optical path portion varies. In this case, as the cavity length X is controlled constant, the voltage V(M) applied to the actuator 25 varies. Therefore, checking the variation in the applied voltage V(M) makes it possible to determine the stabilization of the temperature Tx on the laser optical path portion.

Next, at step S110, |V(M)−V(M−1)| is calculated and compared with a certain threshold voltage Vth3 at the actuator controller 43. If |V(M)−V(M−1)|<Vth3, then it is determined that the temperature Tx on the laser optical path portion converges and it is decided at step S107 that the temperature on the laser cavity 2 is stabilized. If |V(M)−V(M−1)|≧Vth3, then it means that the temperature Tx on the laser optical path portion does not converge but varies. Accordingly, the flow goes to step S111 to advance M by 1 and then returns to step S109.

The threshold voltage level Vth3 may be set from the similar viewpoint to Vth2.

Thus, monitoring the variation in the voltage applied to the actuator 25 makes it possible to decide whether the temperature Tx on the laser optical path portion is stabilized or not.

What is claimed is:

1. A frequency-stabilized laser device generating a laser light in a cavity including a pair of mirrors located at the opposite positions, applying said laser light to an absorption cell to produce a light output signal, and varying the cavity length based on said light output signal to stabilize the frequency of said laser light, the frequency-stabilized laser device comprising:

an actuator arranged to vary said cavity length;
an actuator driver arranged to apply a voltage to said actuator for changing displacement;
a temperature detector arranged to detect the temperature on said cavity;
a temperature adjuster arranged to heat or cool said cavity;
a cavity temperature controller arranged to control said temperature adjuster based on a previously given instruction temperature and the temperature on said cavity detected at said temperature detector; and
an instruction temperature corrector arranged to correct said instruction temperature given to said cavity temperature controller such that said voltage applied to said actuator remains almost constant.

2. The frequency-stabilized laser device according to claim 1, wherein said instruction temperature corrector corrects said instruction temperature given to said cavity temperature controller such that said voltage applied to said actuator follows almost the central value in a range of voltages applied to said actuator.

3. The frequency-stabilized laser device according to claim 1, wherein said instruction temperature corrector corrects said instruction temperature given to said cavity temperature controller, when a variation in said voltage applied to said actuator exceeds a certain range, to absorb said variation.

4. The frequency-stabilized laser device according to claim 1, further comprising an actuator controller arranged to control said instruction temperature corrector and drive of said actuator,
wherein said actuator controller makes a decision on whether the temperature on said cavity is stabilized, and if it is decided in the above decision that the temperature on said cavity is stabilized, then said actuator controller monitors said voltage applied to said actuator.

5. The frequency-stabilized laser device according to claim 4, wherein said actuator controller, before frequency stabilizing, repeats at certain sampling timings the steps of varying said voltage applied to said actuator continuously within a range of voltages applied, monitoring said voltage applied to said actuator that brings the laser frequency at the center of said specific saturated absorption line, and deciding whether the difference between said monitored voltage applied to said actuator and said voltage applied to said actuator monitored in the previous sampling is lower than a certain value,
wherein said actuator controller decides that the temperature on said cavity is stabilized, when said difference is decided lower than a certain value.

6. The frequency-stabilized laser device according to claim 4, wherein said actuator controller, after frequency stabilizing, repeats at certain sampling timings the steps of monitoring said voltage applied to said actuator, and deciding whether the difference between said monitored voltage applied to said actuator and said voltage applied to said actuator monitored in the previous sampling is lower than a certain value, wherein said actuator controller decides that the temperature on said cavity is stabilized, when said difference is decided lower than a certain value.

7. The frequency-stabilized laser device according to claim 1, further comprising a lock-in amp operative to provide a third order differential signal of said light output signal to said actuator controller.

8. The frequency-stabilized laser device according to claim 1, wherein said absorption cell comprises an iodine cell.

9. A laser frequency stabilizing method generating a laser light in a cavity including a pair of mirrors located at the opposite positions, applying said laser light to an absorption cell to produce a light output signal, and controlling the voltage applied to an actuator that varies the cavity length, thereby stabilizing the laser frequency of said light output signal at the center of a specific saturated absorption line contained in said light output signal, the laser frequency stabilizing method comprising:
monitoring said voltage applied to said actuator that brings said laser frequency at the center of said saturated absorption line;
correcting the instruction temperature to said cavity based on said monitored voltage applied to said actuator such that said voltage applied to said actuator remains almost constant; and
controlling the temperature on said cavity based on said corrected instruction temperature.

10. The laser frequency stabilizing method according to claim 9, before frequency stabilizing, including
sweeping said voltage applied to said actuator continuously within a range of voltages applied, and monitoring said voltage applied to said actuator that brings the laser frequency at the center of said saturated absorption line in the sweeping, when monitoring said voltage applied to said actuator, and
correcting the instruction temperature such that said voltage applied to said actuator that brings the laser frequency at the center of said saturated absorption line has a voltage value of almost the center in said range of voltages applied to said actuator, when correcting said instruction temperature.

11. The laser frequency stabilizing method according to claim 9, after frequency stabilizing, including
monitoring said voltage applied to said actuator at certain sampling periods, when monitoring said voltage applied to said actuator, and
correcting said instruction temperature if a variation in said voltage applied to said actuator exceeds a certain range, when correcting the instruction temperature.

12. The laser frequency stabilizing method according to claim 9, further comprising:
deciding whether the temperature on said cavity is stabilized; and
monitoring said voltage applied to said actuator after the temperature on said cavity is decided stabilized.

13. The laser frequency stabilizing method according to claim 12, before frequency stabilizing, including
repeating at certain sampling timings the steps of varying said voltage applied to said actuator continuously within a range of voltages applied, monitoring said voltage applied to said actuator that brings the laser frequency at the center of said specific saturated absorption line, and deciding whether the difference between said monitored voltage applied to said actuator and said voltage applied to said actuator monitored in the previous sampling is lower than a certain value, and
deciding that the temperature on said cavity is stabilized when said difference is decided lower than a certain value.

14. The laser frequency stabilizing method according to claim 12, after frequency stabilizing, including
repeating at certain sampling timings the steps of monitoring said voltage applied to said actuator, and deciding whether the difference between said monitored voltage applied to said actuator and said voltage applied to said actuator monitored in the previous sampling is lower than a certain value, and
deciding that the temperature on said cavity is stabilized when said difference is decided lower than a certain value.

15. A laser frequency stabilizing program generating a laser light in a cavity including a pair of mirrors located at the opposite positions, applying said laser light to an absorption cell to produce a light output signal, and controlling the voltage applied to an actuator that varies the cavity length, thereby stabilizing the laser frequency of said light output signal at the center of a specific saturated absorption line contained in said light output signal, the program comprising computer-executable steps of:
monitoring said voltage applied to said actuator that brings said laser frequency at the center of said saturated absorption line;
correcting the instruction temperature to said cavity based on said monitored voltage applied to said actuator such that said voltage applied to said actuator remains almost constant; and
controlling the temperature on said cavity based on said corrected instruction temperature.

16. The laser frequency stabilizing program according to claim 15, before frequency stabilizing, including
sweeping said voltage applied to said actuator continuously within a range of voltages applied, and monitoring said voltage applied to said actuator that brings the laser frequency at the center of said saturated absorption line in the step of sweeping, when monitoring said voltage applied to said actuator, and
correcting the instruction temperature such that said voltage applied to said actuator that brings the laser frequency at the center of said saturated absorption line has a voltage value of almost the center in said range of voltages applied to said actuator, when correcting said instruction temperature.

17. The laser frequency stabilizing program according to claim 15, after frequency stabilizing, including
monitoring said voltage applied to said actuator at certain sampling periods, when monitoring said voltage applied to said actuator, and
correcting said instruction temperature when a variation in said voltage applied to said actuator exceeds a certain range, when correcting the instruction temperature.

18. The laser frequency stabilizing program according to claim 15, further comprising:
deciding whether the temperature on said cavity is stabilized; and
monitoring said voltage applied to said actuator after the temperature on said cavity is decided stabilized.

19. The laser frequency stabilizing program according to claim 18, before frequency stabilizing, including
repeating at certain sampling timings the steps of varying said voltage applied to said actuator continuously within said range of voltages applied, monitoring said voltage applied to said actuator that brings the laser frequency at the center of said specific saturated absorption line, and deciding if the difference between said monitored voltage applied to said actuator and said voltage applied to said actuator monitored in the previous sampling is lower than a certain value, and deciding that the temperature on said cavity is stabilized when said difference is decided lower than a certain value.

20. The laser frequency stabilizing program according to claim 18, after frequency stabilizing, including repeating at certain sampling timings the steps of monitoring said voltage applied to said actuator, and deciding whether the difference between said monitored voltage applied to said actuator and said voltage applied to said actuator monitored in the previous sampling is lower than a certain value, and deciding that the temperature on said cavity is stabilized when said difference is decided lower than a certain value.

* * * * *